GILL & HUMMEL.
Machine for Thrashing and Cleaning Grain.
No. 87,254. Patented Feb. 23, 1869.
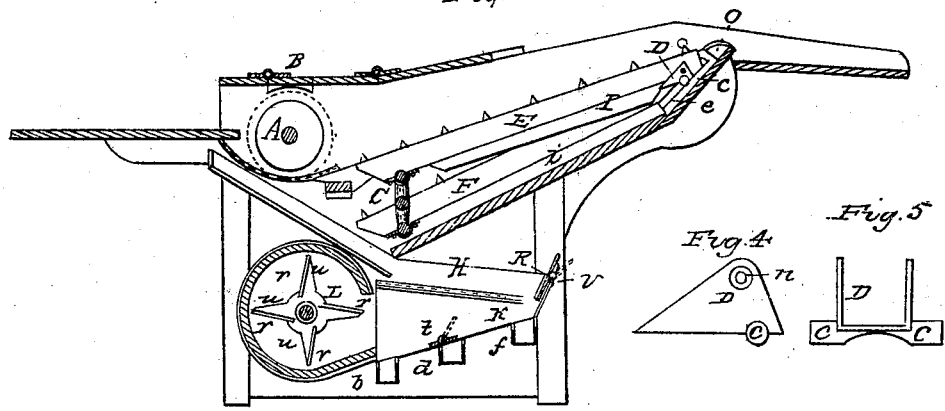
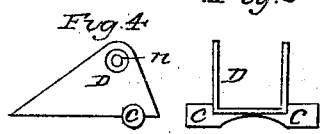
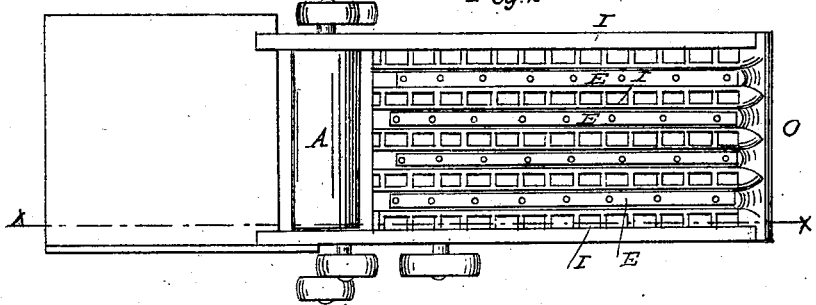
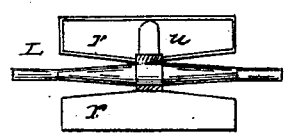
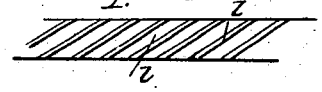
Witnesses
L. Hailer.
P T Dodge.
Inventors
Henry Gell &
Theodore Hummel
by Dodge Hummel
Attys.

HENRY GILL AND THEODORE HUMMEL, OF MANSFIELD, OHIO, ASSIGNORS TO HENRY GILL, OF SAME PLACE.

Letters Patent No. 87,254, dated February 23, 1869.

IMPROVEMENT IN MACHINE FOR THRESHING AND CLEANING GRAIN.

The Schedule referred to in these Letters Patent and making part of the same.

*To all whom it may concern:*

Be it known that we, HENRY GILL and THEODORE HUMMEL, of Mansfield, in the county of Richland, and State of Ohio, have invented certain new and useful Improvements in Threshing-Machines; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Our invention consists in certain improvements in machines for threshing and cleaning grain, as hereinafter explained.

Figure 1 is a longitudinal vertical section, taken on the line x-x of fig. 2.

Figure 2 is a top plan view, with cover removed.

Figures 3, 4, 5, 6, and 7, are views of portions shown detached and more in detail.

Our improvements are applicable to all ordinary threshing-machines, but are represented as applied in this instance to what is known as an "overshot" thresher, in which—

A represents the cylinder, and

B, the concave, hinged above it, as shown in fig. 1, and as ordinarily constructed.

The improvements relate to those portions of the machine which move the straw, and separate and clean the grain after it leaves the cylinder.

The straw-carrier or shaker, we make of a series of bars, E, having their front ends attached to a serial crank, C, shown detached in fig. 3, and having their rear ends secured in a metal box or shoe, D, shown detached in figs. 4 and 5, which shoe D has a journal, c, projecting from each side, and which slide in grooves e, fig. 1.

Alternating with these shaking-bars E, we locate a series of stationary bars, I, which are pierced their entire length with a series of oblique openings, l, as shown in section in fig. 6, through which openings the grain falls, when separated from the straw by the shaking-bars E.

At the rear end of the bars we place a permanent ledge, o, having its front face nearly vertical, with its upper surface rounded, as shown in fig. 1, for the purpose of permitting the straw to pass over it readily, while it serves to catch such kernels of grain as may be carried that far, and turn them down on the bottom board i, fig. 1.

The fan L we construct with wings r, supported at the centre upon a single arm, u, said wings tapering or narrowing in width, from the centre toward each end, as shown in fig. 7.

These wings, instead of standing radial from the shaft, are placed oblique or tangential, as represented in fig. 1, whereby we obtain a stronger blast; and by making them of the form shown, and supporting them by an arm at the centre only, the air, in entering, meets with less obstruction.

At the rear end of the sieve-box we use a tail-board, R, composed of two parts, the lower part sliding in grooves, as usual, while the upper part is hinged to the lower part at v, fig. 1, whereby the upper portion, while being adjusted vertically with the lower part, can also be inclined, as represented in red, independent of the other portion.

The bottom incline K, which receives the grain as it falls from the screen H, is provided with three transverse spouts, b, d, and f, as shown in fig. 1.

Over the central spout, d, is an opening in the incline K, over which is hinged a cover, t, that may be closed or opened at pleasure.

By means of this, we are enabled to assort or separate the wheat or other grain into two grades or qualities, in the act of threshing and cleaning it. The heavier and better quality of grain will fall at the front of the screen, and, falling on the lower portion of the incline K, will be delivered at the spout b, while the lighter and inferior quality will be driven further back by the blast, and, falling on the rear portion of the incline K, will be delivered at the central spout d.

The tailings, consisting of heads or parts of heads not perfectly threshed, will pass from the rear end of the screens into the spout f, from whence they may be conveyed, by an elevator, back to the cylinder, to be rethreshed in the usual manner.

By closing the cover t, the grain will all be delivered at the lower spout, as is necessary in threshing oats and such other grains as do not require to be assorted into different grades for market.

By using the perforated bars I, we afford greater facilities for the escape of the grain from among the straw; and the peculiar motion of the shaking-bars E, which move in a circle at their front end, and in an oblique straight line at their rear end, serves to thoroughly shake up the straw, and separate the grain therefrom.

The metallic shoes D afford a strong and durable device for securing the rear end of the bars, and altogether render the machine very efficient.

Having thus described our invention,

What we claim, is—

1. The stationary bars I, having the perforations l, for the passage of the grain, substantially as described.

2. The tail-piece o, constructed and arranged to operate as shown and described.

3. The fan, having its wings r, tapering from the centre toward each end, supported on a single arm at the centre, and arranged tangentially, all substantially as set forth.

4. The metal shoe D, constructed as shown and described, for the purpose of supporting the rear ends of the bars E.

5. The tail-board R, consisting of the two parts hinged, so that the upper part can be inclined more or less, as described.

6. The arrangement of the incline K with the lid or cover t, and the spouts b and d, for separating or grading the grain, substantially as set forth.

7. So arranging the shaker-bars E that their front ends shall move in a circle, and their rear ends in an oblique straight line, as described.

HENRY GILL.
THEODORE HUMMEL.

Witnesses:
L. J. BONAR,
G. W. BLYMYER.